Jan. 29, 1957            R. S. ZEBARTH            2,779,052

RECIRCULATING PUMP FOR POULTRY CHILLING TANKS

Filed June 21, 1954            2 Sheets-Sheet 1

INVENTOR.
Ralph S. Zebarth
BY
ATTORNEY.

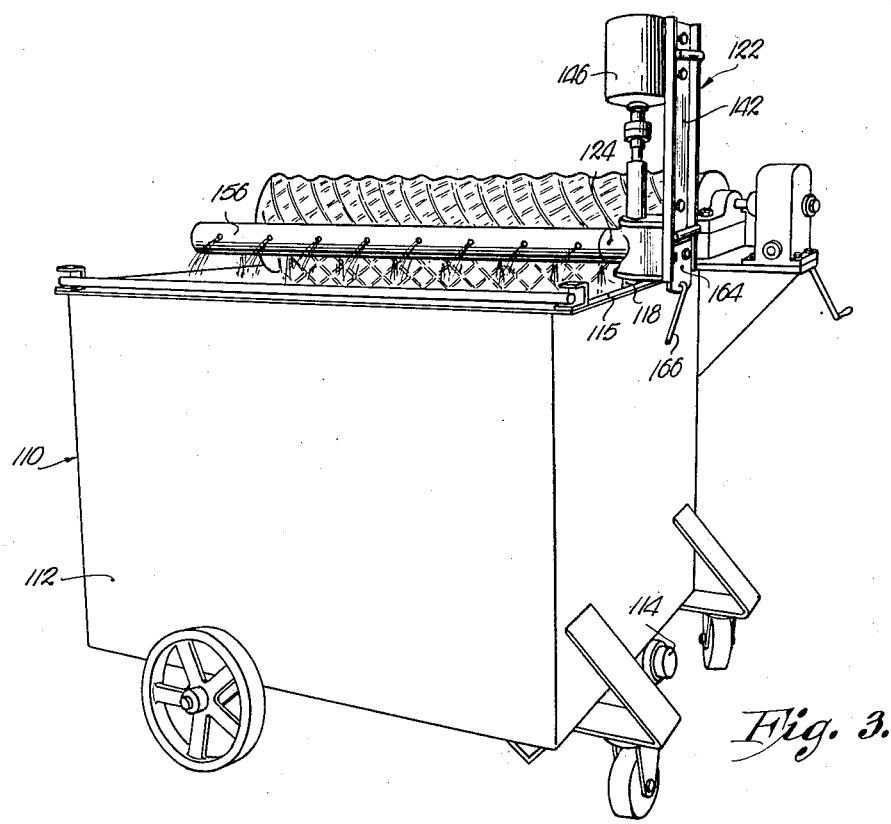
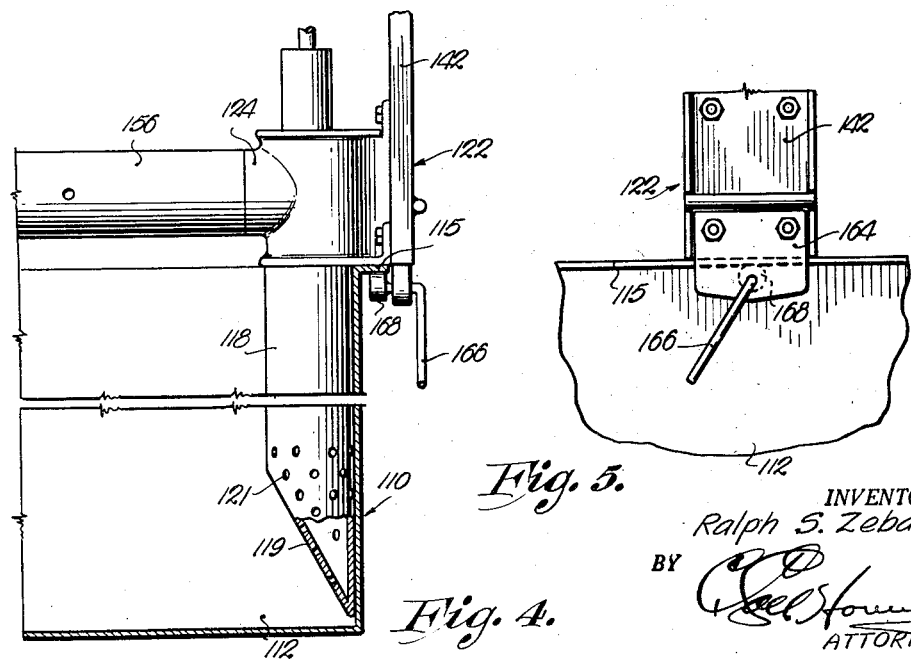

United States Patent Office 2,779,052
Patented Jan. 29, 1957

2,779,052
RECIRCULATING PUMP FOR POULTRY CHILLING TANKS

Ralph S. Zebarth, Hickman Mills, Mo., assignor to Gordon Johnson Equipment Company, Kansas City, Mo., a corporation of Missouri Application June 21, 1954, Serial No. 437,910

2 Claims. (Cl. 17—11)

This invention relates to improvements in equipment used in the processing of poultry and particularly to the subject matter of U. S. Letters Patent No. 2,637,066, in the name of Gordon W. Johnson, issued May 5, 1953.

It is the most important object of the instant invention to provide a recirculating pump assembly for poultry chilling apparatus in the nature of that covered by the aforesaid patent, which assembly is not only capable of recirculating, and therefore, agitating the cold water used in the chilling apparatus, but usable interchangeably on any one of a number of tanks.

An important object of the instant invention is to provide a pump unit that may be quickly and easily slipped into place in operative relationship to a poultry chilling tank without requiring use of tools in assembly or removal.

Another important object is to provide recirculating means in the nature of a self-contained pump unit wherein the pump housing carries not only the prime mover for the pump, but receives a perforated manifold for returning the cold water to the chilling tank from the outlet spout of the pump housing.

Other objects include important details of construction, all of which will be made clear as the following specification progresses.

In the drawing:

Fig. 3 is a perspective view of a recirculating pump for poultry chilling tanks made according to a modified form of the instant invention.

Fig. 4 is an enlarged, fragmentary, cross-sectional view through the tank shown in Fig. 3, illustrating the manner of releasably mounting the pump assembly thereon; and Fig. 5 is an enlarged, fragmentary, elevational view illustrating the releasable means of attachment for the pump assembly.

Figure 1:
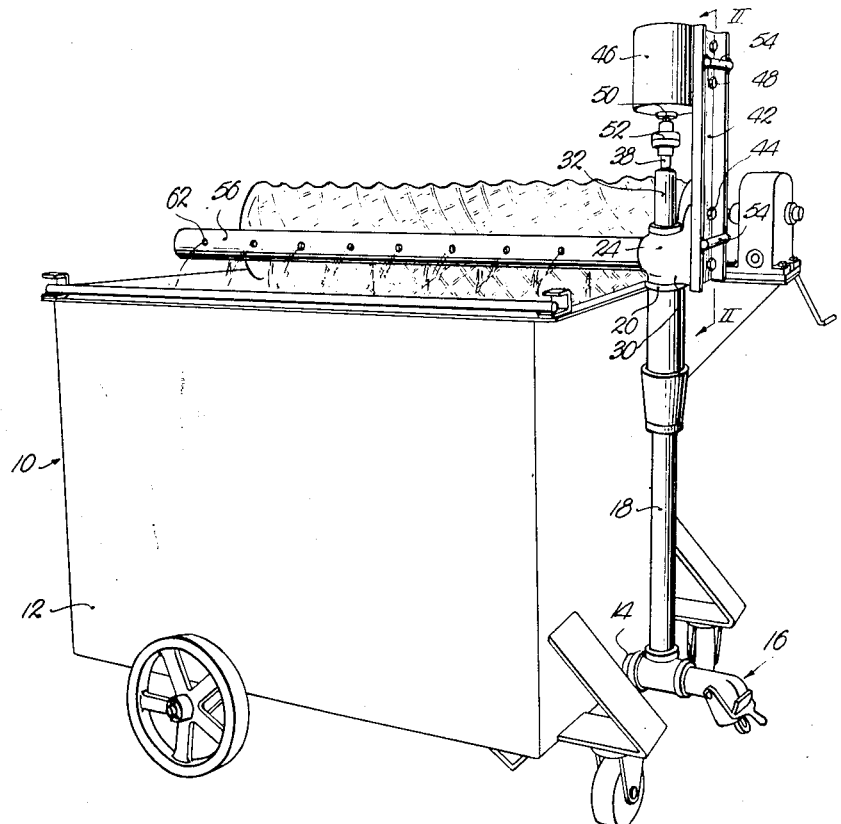
Figure 1 is a perspective view of a recirculating pump for poultry chilling tanks made pursuant to one form of the present invention.

The poultry chilling apparatus shown in Fig. 1 of the drawings and broadly designated by the numeral 10, is essentially the same as that forming the subject matter of said Patent No. 2,637,066, and therefore, said patent disclosure is incorporated herein by reference for a complete understanding of the operation and use thereof.

It may be pointed out that the apparatus 10 includes an open top tank 12 adapted to contain water that may be chilled through use of cracked ice. Tank 12 has an outlet tube 14 at one end thereof near its bottom and may be drained by opening a manual valve 16.

Figure 2:
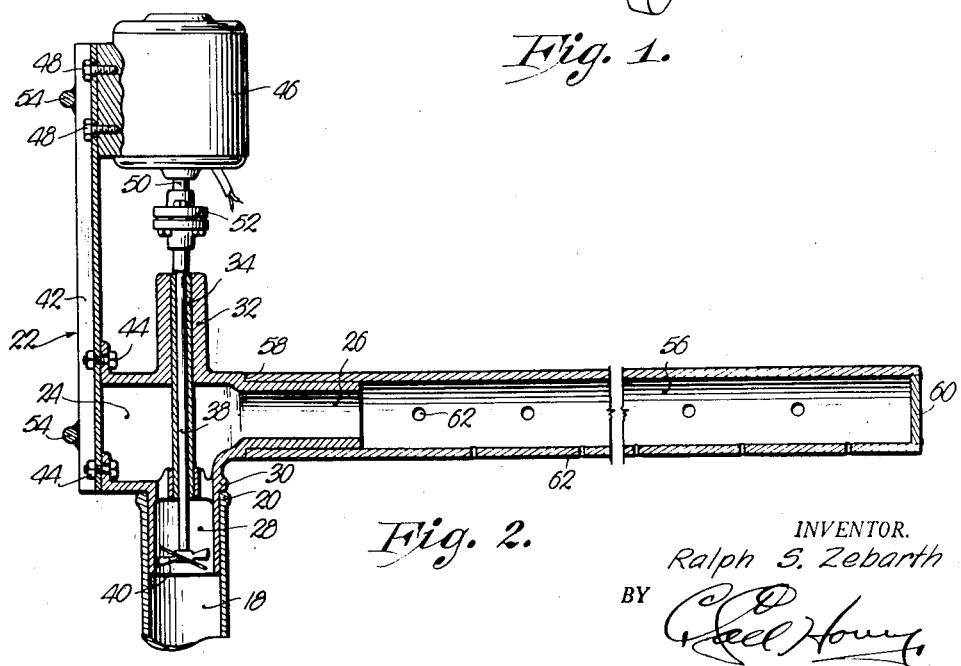
Fig. 2 is an enlarged, fragmentary, cross-sectional view taken substantially on line II—II of Fig. 1.

The recirculating system forming the subject matter of Figs. 1 and 2, includes an upstanding pipe 18 coupled with the tube 14, terminating adjacent the upper edge of the tank 12 and provided with an annular bead 20 at the uppermost edge thereof. A unitary pump assembly broadly designated by the numeral 22 has its component parts so formed and assembled as to be supported entirely by the pipe 18 for quick and easy removal and replacement.

The assembly or unit 22 includes a hollow body or pump housing 24 provided with a laterally extending, tubular outlet spout 26 and a depending inlet spout 28 substantially at right angles to the spout 26. The spout 28 is adapted to slip into the pipe 18 for communication therewith and support by the pipe 18, there being an external bead 30 on the spout 28 in engagement with the bead 20 to limit the extent of downward movement of the assembly 22 with respect to the pipe 18 and the tank 12.

Housing 24 is also provided with an upstanding bearing 32 in vertical alignment with the spout 28 which receives a bushing 34 supported at its lowermost end by a spider 36 integral with the body 24 at the upper end of inlet spout 28. The bushing 34 rotatably receives an elongated shaft 38 having a water pump propeller 40 mounted on its lowermost end and disposed within the inlet spout 28 adjacent the lower end of the latter.

One end of the housing 24 opposite to the outlet spout 26 is closed by a bracket 42 that may be U-shaped in cross-section as shown, and rigidly secured to the housing 24 by bolt and nut means or other fasteners 44. The bracket 42 extends upwardly from the housing 24 and receives an electric motor or other prime mover 46 through the medium of suitable fasteners such as studs 48. Motor 46 has its drive shaft 50 disposed vertically and is attached to the uppermost end of the shaft 38 through the medium of a coupling 52. The legs of the U-shaped bracket 42 are joined by a pair of spaced-apart handles 54.

An elongated, tubular manifold 56 is releasably telescoped over the outlet pipe 26 and abuts against a shoulder 58 on the body 24. The opposite end of the manifold 56 has a closure 60 and several rows of perforations 62 are formed in the manifold 56 along the sides and bottom thereof.

It is seen in Figure 1 of the drawings that in normal operation, when the assembly 22 is supported by the pipe 18, manifold 56 extends longitudinally of the tank 12 thereabove. Thus, when prime mover 46 is coupled with a source of electrical energy to rotate the shaft 38 and, therefore, the propeller 40, water will be drawn upwardly through the pipe 18 and be discharged back into the tank 12 through the perforations 62 of manifold 56. It is, of course, understood that the level of water in the tank 12 is maintained above the propeller 40. When poultry and ice are placed in the tank 12 and when the said poultry is removed therefrom in the manner disclosed by said patent, the manifold 56 may be easily swung out of the way because of the rotative interconnection between inlet spout 28 and the pipe 18.

A further important feature of the recirculating system hereinabove described, lies in the way in which the entire assembly 22 may be easily and quickly removed from the pipe 18 by grasping the handles 54. The operator may simply raise the unit 22 upwardly and carry it to another tank 12 for insertion into its pipe 18. Thus, through use of a single unit 22, one poultry chilling apparatus may be operating to chill the poultry through use of the recirculating system of the instant invention while other tanks are being loaded with poultry and ice and while workmen are removing the birds from tanks that have previously been placed in use to quickly and efficiently chill the birds.

It can be appreciated that by recirculation of the cold water, the body heat of the birds is more quickly removed and that because of the quick and ready removability of the unit 22, it is unnecessary to provide a pumping arrangement for each of several chilling tanks. The entire operation therefore, is speeded up and such factor is extremely important in this particular industry.

In the embodiment of my invention illustrated in Figs. 3 to 5 inclusive, apparatus 110 includes an open top tank 112 provided with drain means 114, it being noted that tank 112 has an out-turned flange 11 at the uppermost edge thereof.

The recirculating system includes an elongated pipe 118 disposed within the tank 112 and terminating near the bottom thereof as shown in Fig. 4. The lowermost end of the pipe 118 is provided with a sloping plate 119 having a plurality of openings 121, which openings or perforations extend upwardly into the circular portion of the pipe 118.

A unitary pump assembly broadly designated by the numeral 122 is virtually identical with the unit 22 of Figs. 1 and 2 in that it is provided with a pump housing 124 from which extends a removable, tubular manifold 156. The pump (not shown) which is driven by electric motor 146 extends through the housing 124 into the pipe 118 in substantially the same way as pump means 40 in Fig. 2. Upstanding bracket 142 supports the motor 146 and encloses the outer end of the housing 124 and it is upon the lowermost end of the bracket 142 that there is provided quickly releasable means for attaching the entire unit to the tank 112.

A plate 164 bolted or otherwise secured to the bracket 142 receives an L-shaped, swingable handle 166 having a cam 168 rigidly secured thereto for engagement with the flange 115 therebelow.

In this form of the invention, pipe 118 is screw-threaded into the lowermost end of the housing 124 or otherwise secured thereto. Consequently, upon release of the locking means 166—168, the entire unit including the pipe 118, may be removed from the tank 112 and re-positioned in another tank for use in the manner above described. Notable particularly in Fig. 4 of the drawings is the fact that housing 124 rests directly upon the flange 115 and when the handle 166 is swung to the position shown in Fig. 5, the flange 115 will be clamped tightly between cam 168 and the housing 124.

Having thus described the invention what is claimed as new and desired to be secured by Letters Patent is:

1. For an open top poultry chilling tank, a recirculating system including a pipe adapted to be coupled with the tank and having an open uppermost end; a pump housing provided with a pump; a prime mover for the pump carried by the housing; a tubular outlet; an inlet spout for the housing in telescoped relationship to said pipe; and means limiting the extent of downward movement of the housing relative to the pipe, said outlet extending from the housing over the tank when the spout is in the pipe.

2. In combination with an open top poultry chilling tank, a recirculating system including a pipe coupled with the tank and having an open uppermost end; a pump housing provided with a pump; a prime mover for the pump; a tubular outlet extending from the housing over the tank; a bracket closing one end of the housing in opposed relationship to the outlet, said prime mover being mounted on the bracket; an inlet spout for the housing in telescoped relationship to said pipe; and means limiting the extent of downward movement of the housing relative to the pipe.

References Cited in the file of this patent

UNITED STATES PATENTS

| | | |
|---|---|---|
| Re. 22,917 | Chamberlain | Sept. 23, 1947 |
| 1,673,594 | Schmidt | June 12, 1928 |
| 2,011,107 | Lape | Aug. 13, 1935 |
| 2,617,669 | Ruthman et al. | Nov. 11, 1952 |